United States Patent
Gensler, Jr. et al.

(10) Patent No.: US 9,183,243 B2
(45) Date of Patent: Nov. 10, 2015

(54) BUILDING A METADATA INDEX FROM SOURCE METADATA RECORDS WHEN CREATING A TARGET VOLUME FOR SUBSEQUENT METADATA ACCESS FROM THE TARGET VOLUME

(71) Applicant: International Business Machines Corporation, Armonk, NY (US)

(72) Inventors: Robert S. Gensler, Jr., Vail, AZ (US); Jason R. Luurs, Tucson, AZ (US); Jeffrey R. Suarez, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 14/023,442

(22) Filed: Sep. 10, 2013

(65) Prior Publication Data
US 2015/0074051 A1    Mar. 12, 2015

(51) Int. Cl.
*G06F 17/30*        (2006.01)
*G06F 12/16*        (2006.01)

(52) U.S. Cl.
CPC .... *G06F 17/30336* (2013.01); *G06F 17/30575* (2013.01)

(58) Field of Classification Search
None
See application file for complete search history.

(56) References Cited

U.S. PATENT DOCUMENTS

| | | | |
|---|---|---|---|
| 6,557,089 B1 | 4/2003 | Reed et al. | |
| 6,760,713 B2 | 7/2004 | Beier et al. | |
| 6,993,629 B2 | 1/2006 | Beardsley et al. | |
| 7,356,493 B2 | 4/2008 | Choi et al. | |

OTHER PUBLICATIONS

Burger, C., "FlashCopy in a zSeries Environment", dated Apr. 9, 2007, IBM System Storage Advanced Technical Support, pp. 1-72.
IBM, "DFSMSdss Storage Administration", dated Apr. 2010, (online) retrieved from the Internet at URL>http:www.ibm. com/servers/eserver/zseries/zos/webqs.html, Version 1 Release 11, Fourteenth Edition, pp. 1-686.
IBM, "DFSMS Managing Catalogs", dated Sep. 2010, (online) retrieved from the Internet at URL>http:http:// publib.boulder.ibm.com/infocenter/zos/v1r12/index.jsp?topic=%2Fcom.ibm.zos.r12.idac100%2Fdgt2c180.htm, pp. 1-266.
IBM "Combining Volume Copy and Volume Dump to Reduce Your Backup Window", (online) retrieved from the Internet on Aug. 8, 2013 at URL>http:publib.boulder.ibm.com/infocenter/zos/v1r11/topic/com.ibm.zos.r11.adru000/ u2137.htm, pp. 1-3.

*Primary Examiner* — Kevin Verbrugge
(74) *Attorney, Agent, or Firm* — David W. Victor; Konrad Raynes Davda & Victor LLP (57) ABSTRACT

Provided are a computer program product, system, and method for building a metadata index from source metadata records when creating a target volume for subsequent metadata access from the target volume. A copy operation is initiated to copy the source volume to the target volume, wherein the target volume is created with a target volume name different from a source volume name of the source volume. Source volume metadata having records including information on data sets in the source volume is copied to target volume metadata. A metadata index is generated indicating locations of the records in the target volume metadata having information on the data sets in the target volume. The metadata index is used to access the records in the target volume metadata when accessing data sets in the target volume.

24 Claims, 5 Drawing Sheets

BUILDING A METADATA INDEX FROM SOURCE METADATA RECORDS WHEN CREATING A TARGET VOLUME FOR SUBSEQUENT METADATA ACCESS FROM THE TARGET VOLUME

BACKGROUND OF THE INVENTION

1. Field of the Invention

The present invention relates to a computer program product, system, and method for building a metadata index from source metadata records when creating a target volume for subsequent metadata access from the target volume.

2. Description of the Related Art

In certain computing environments, multiple host systems may update data sets in volumes configured in a storage system, such as interconnected storage devices, e.g., a Direct Access Storage Device (DASD), Redundant Array of Independent Disks (RAID), Just a Bunch of Disks (JBOD), etc. Data sets are comprised of extents, which may comprise any grouping of tracks and data storage units. The Z/OS® operating system from International Business Machines Corporation ("IBM") has a Volume Table of Contents (VTOC) to provide information about data sets configured in the volume, where the VTOC indicates the location of tracks, extents, and data sets for a volume in storage. For System Managed Storage (SMS), the z/OS operating system provides a VSAM volume data set (VVDS) having records providing metadata for VSAM and non-VSAM data sets. The VTOC has information on non-VSAM and VSAM data sets in the volume. The records in the VVDS comprise a VSAM Volume Record (VVR) providing metadata for VSAM data sets and non-VSAM Volume Records (NVR) providing metadata for non-VSAM or non-indexed data sets. (Z/OS is a registered trademark of IBM in the United States and other countries)

Programs that process data sets obtain information from these VVDS records to determine how the data sets should be handled. Since the VVDS is not indexed, a catalog has information about the location of the VVDS record for the data set. A catalog stores logical information about a dataset and the VVDS stores physical information for a data set, such as the physical track address in storage. The catalog enables fast access to a VVDS record. Programs that require VVDS records use a service that accesses the catalog to determine the location of the required VVDS record.

When copying a source volume to a target volume, if the target volume has the same VOLSER, or volume serial number, as the source volume, then the target volume would have to be taken offline. To allow the target volume to remain online, the target volume would have to have a different VOLSER than the source VOLSER. A conditioned volume is a copy of a volume that retains its original target VOLSER.

In the IBM Data Facility Storage Management Subsystem (DFSMS), a conditioned volume is a target volume that has the same named VTOC and VVDS as the source, but the volume name (VOLSER) is different, allowing the target volume to be online with the source volume. A conditioned target volume is created with a DFSMSdss COPY FULL called with the DUMPCONDITIONING keyword. A COPY FULL command would copy the volume label which is part of track zero resulting in the target volume having the same VOLSER as the source volume. However, use of the DUMPCONDITIONING keyword enables the target volume to remain online with a different target VOLSER. However, the VTOC, VTOC Index and VVDS have the same name as they did on the source volume.

Figure 1:
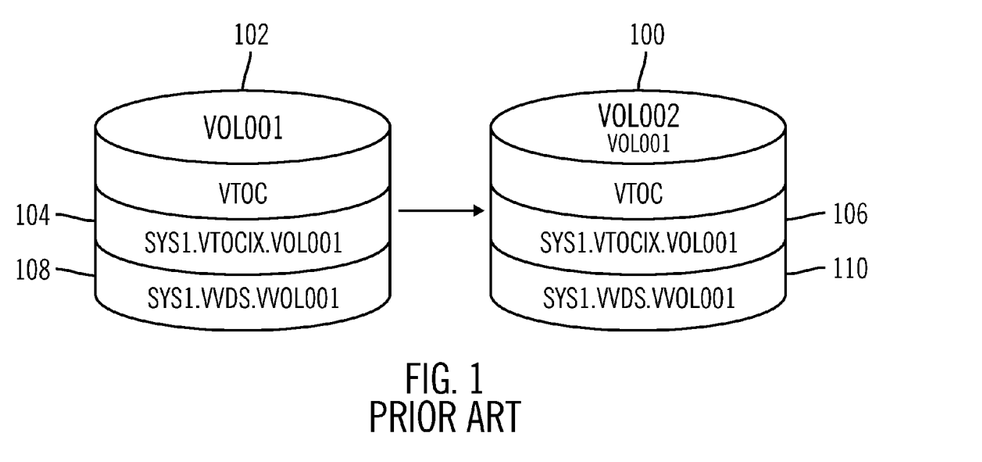
FIG. 1 illustrates a target volume copied from a source volume in the prior art.

FIG. 1 illustrates a target volume 100 comprising a conditioned copy of source volume 102. The source volume 102 has a different volume name ("VOL001") than the target volume 100 ("VOL002"). However, the source VTOC name 104 has a same name as the copied target VTOC 106 and the source VVDS name 108 has a same name as the target VVDS 110. With the conditioned target volume, the catalog cannot be used to access the VVDS records because the target VOLSER name is different from the source VVDS name. A process that wants to access a record in the target VVDS 110 for a data set in the target volume needs to scan the entire content of the target VVDS 110 to locate the VVDS record for the target data set to access.

SUMMARY

Provided are a computer program product, system, and method for building a metadata index from source metadata records when creating a target volume for subsequent metadata access from the target volume. A copy operation is initiated to copy the source volume to the target volume, wherein the target volume is created with a target volume name different from a source volume name of the source volume. Source volume metadata having records including information on data sets in the source volume is copied to target volume metadata. A metadata index is generated indicating locations of the records in the target volume metadata having information on the data sets in the target volume. The metadata index is used to access the records in the target volume metadata when accessing data sets in the target volume.

DETAILED DESCRIPTION

Described embodiments provide techniques for building a metadata index from source metadata records being copied to target metadata records as part of a copy operation. The metadata index built during the copy operation from the source volume metadata records may be used to access records from the target volume metadata, which is then used to access the target data sets.

Figure 2:
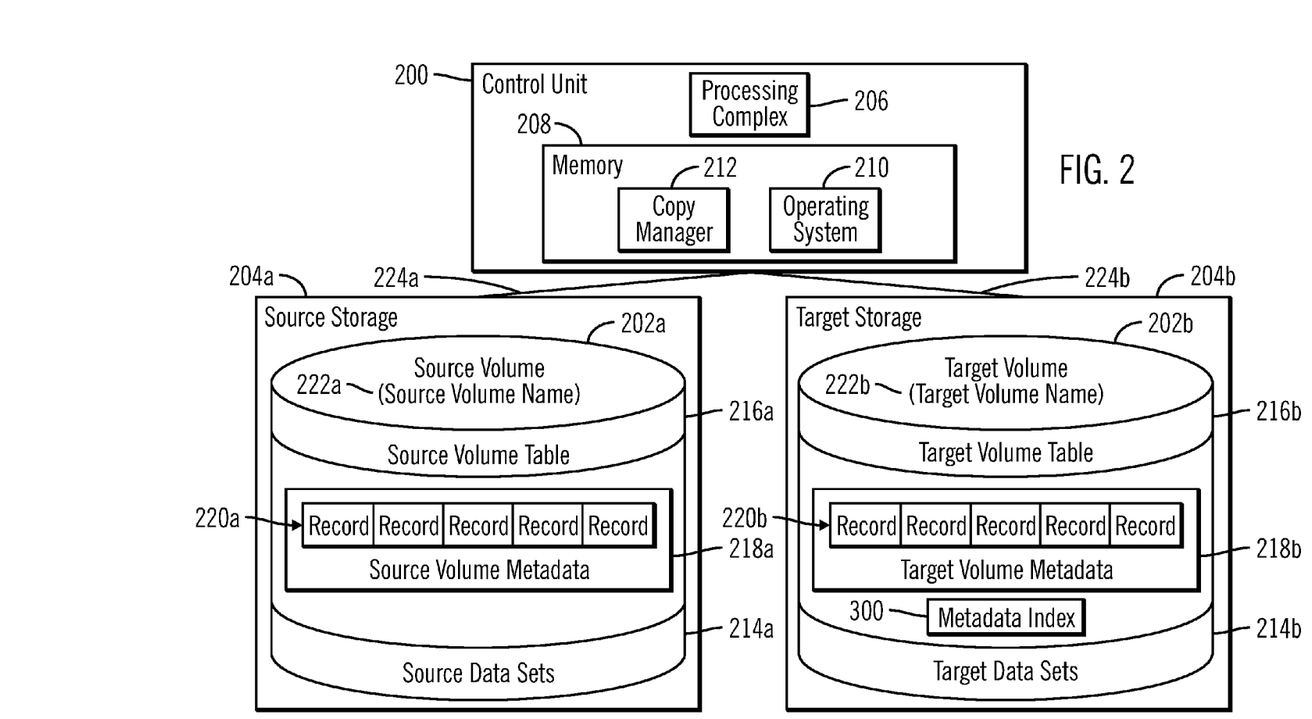
FIG. 2 illustrates an embodiment of a copy environment.

FIG. 2 illustrates an embodiment of a volume copy environment. Control unit 200, such as a storage controller or server, manages the copying of a source volume 202a in a source storage 204a to a target volume 202b in a target storage 204b. The controller 200 includes a processing complex 206 comprising one or more processors, each including one or more processing cores, and a memory 208 storing various program modules executed by the processor 206, including an operating system 210 to manage the storage and access of data sets 214a, 214b in the volumes 202a, 202b and a copy manager 212 to manage the copying of source volumes 202a to target volumes 202b.

The source 202a and target 202b volumes include data sets 214a and 214b, respectively. A data set 214a, 214b comprises a collection of data intended to be stored in a same logical allocation of data, such as data from a single application, user, enterprise, etc. A data set 214a, 214b may be comprised of separate files or records, or comprise a single file or record. The data sets 214a, 214b may comprise indexed data sets, such as a Key Sequenced Data Set (KSDS) in a VSAM implementation, that are indexed according to a primary key that is used to locate records in the data sets 214a, 214b. The data sets 214a, 214b may also include non-indexed data sets, e.g., non-KSDSs.

The source 202a and target 202b volumes may further include a source 216a and target 216b volume tables that provide information on the location of the data sets 214a, 214b in the storages 204a, 204b. Source volume metadata 218a and target volume metadata 218b include records 220a, 220b, where there is a record for each of the data sets 214a, 214b providing metadata information used to access the record. Each metadata record 220a, 220b may have metadata for each data set 214a, 214b in a volume 202a, 202b, respectively, including the one or more extents assigned to the data set 214a, 214b.

The volume tables 216a, 216b and volume metadata 218a, 281b may provide metadata for different types of data sets 214a, 214b. For instance, the source 218a and target 218b volume metadata have records 220a, 220b that provide information used to access a first and second types of data sets 214a, 214b. The source 216a and target 216b volume tables have metadata that may be used to access a second type of data set in the volumes 202a, 202b. For instance, the first type of data set may comprise indexed data, such as KSDS data sets and the second type of data may comprise non-indexed data sets.

The target storage 202b includes a metadata index 300 that is generated while the source volume metadata 218a is being copied to the target volume metadata 218b as part of a copy operation, such as a point-in-time copy operation, e.g., snapshot, FlashCopy® or other copy operation, or other type of copy operation. (FlashCopy is a registered trademark of IBM in the United States and other countries). In certain embodiments, during the copy operation, the metadata 216a and 218a is copied first before the data sets are copied.

In one VSAM embodiment and implementation, the first type of data set comprises an indexed Key Sequenced Data Set (KSDS) and the second type of data set comprises a non-indexed data set, e.g., non-KSDS. Each record in a KSDS data set has a unique key used to locate the record in the data set. In such VSAM embodiments, the source 218a and target 218b volume metadata comprise source and target VSAM Volume Data Sets (VVDSs) and the records 220a and 220b in the source and target VVDSs comprise VSAM volume records (VVRs) and non-VSAM volume records (NVRs) providing metadata for the KSDS and non-KSDS types of data sets, respectively. In this VSAM embodiment, the source 216a and target 216b volume tables comprise source and target volume table of contents (VTOCs) providing information on the non-KSDS data sets. The source VVDS, the source VTOC, the target VVDS, and the target VTOC, and source and target catalogs may each include the source volume name as a component of their names. Further, the copy operation to copy the source volume 202a to the target volume 202b may comprise the IBM FlashCopy® operation. Although one embodiment may be implemented in the IBM VSAM environment, the described embodiments are not limited to implementations using the IBM VSAM implementation, including KSDSs, VVDS, VVRs, NVRs, and VTOC volume elements nor limited to the IBM FlashCopy® point-in-time copy.

In one embodiment, the source volume 202a and the target volume 202b have different names 222a, 222b, such as different VOLSERs. In alternative embodiments, the source 202a and target 204a volume names may be the same.

In alternative embodiments, there may only be source 218a and target 218b volume metadata and no separate volume table 216a, 216b metadata, such that all the data set 214a, 214b metadata is maintained in the records 218a, 281b, respectively.

Although the program components 210 and 212 are shown as separate components, the operations described with respect to these components may be combined in one or more modules than shown. Further the components 210 and 212 may be implemented as program code executed by the processing complex 206 or may be implemented in part or whole in hardware devices.

The storages 204a, 204b may comprise one or more storage devices known in the art, such as interconnected storage devices (e.g., configured as a DASD, RAID, JBOD, virtualized devices, etc.), as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

The control unit 200 communicates with the storages 204a, 204b via connections 224a, 224b. The connections 224a, 224b may comprise one or more networks, such as a Local Area Network (LAN), Storage Area Network (SAN), Wide Area Network (WAN), peer-to-peer network, wireless network, etc. Alternatively, the connection 224a, 224b may comprise bus interfaces, such as a Peripheral Component Interconnect (PCI) bus or serial interface or wireless connections.

Figure 3:
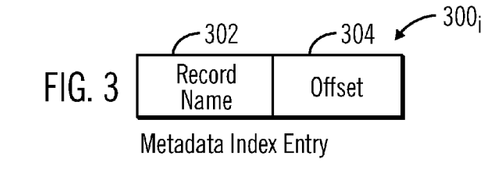
FIG. 3 illustrates an embodiment of a metadata index entry.

FIG. 3 illustrates an embodiment of an instance of a metadata index entry 300, in the metadata index 300 for one of the records 220b in the target volume metadata 216a. The entry $300_i$ for one of the records 220b includes a record name 302, which can be derived from the data set 214b name for which the record $300_i$ is provided, and an offset 304 in the target volume metadata 216a at which the record 220b is located, such as a relative byte address (RBA).

Figure 4:
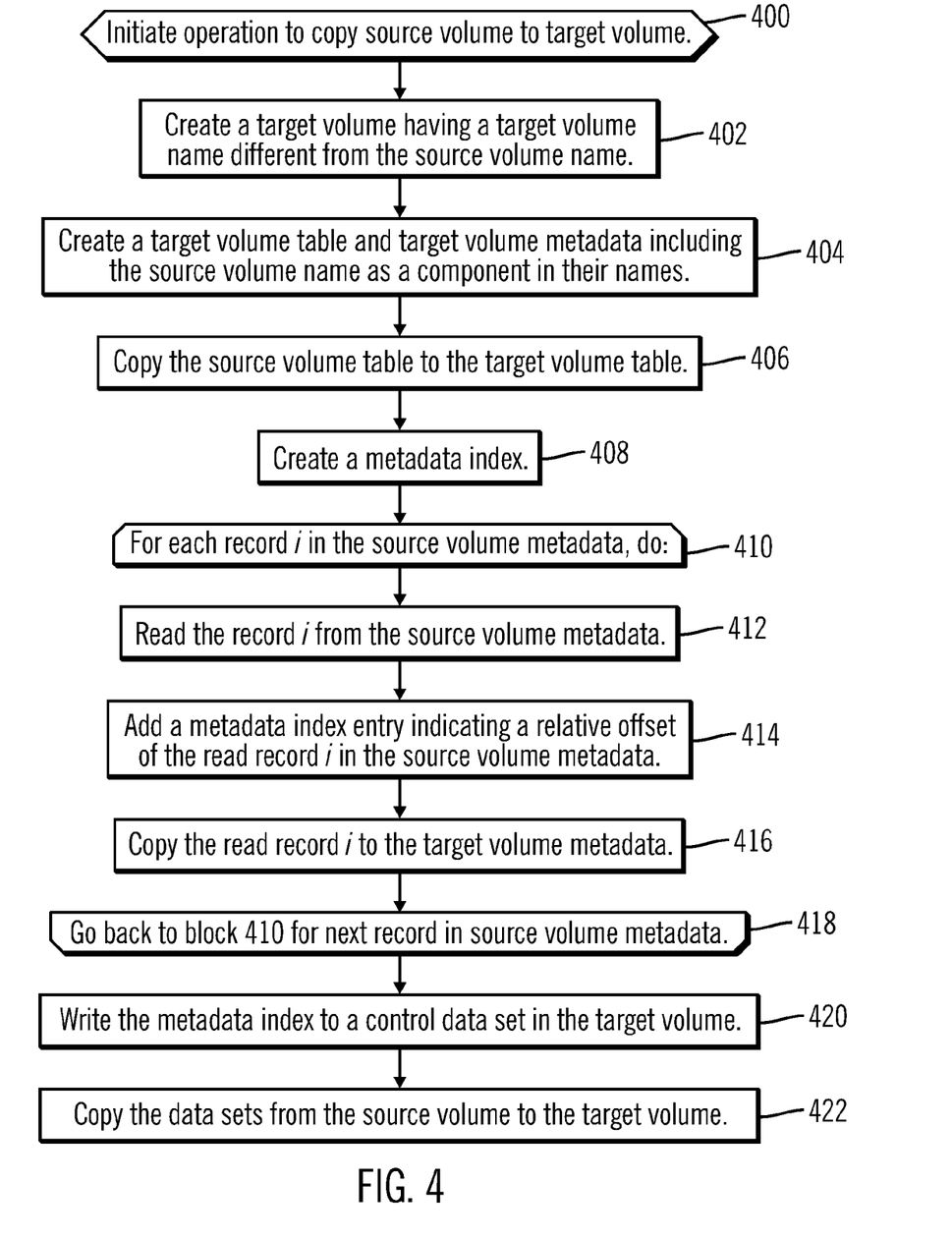
FIG. 4 illustrates an embodiment of operations to generate a metadata index.

FIG. 4 illustrates an embodiment of operations performed by the copy manager 212 to copy a source volume 202a to a target volume 202b. Upon initiating (at block 400) the copy operation, the copy manager 212 creates (at block 402) a target volume 202b having a target volume name 222b, e.g., VOLSER, different from the source volume name 222a. Having different names 222a, 222b allows both the source volume 202a and target volume 204 to remain online and accessible at the same time. The copy manager 212 creates (at block 404) a target volume table 216b and target volume metadata 218b, which may include the source volume name 222a as a component in their names. The source volume table 216a is copied (at block 406) to the target volume table 216b. A metadata index 300 is created (at block 408). For each record i 220a in the source volume metadata 218a, a loop (at blocks 410 through 418) of operations (at blocks 412 through 416) is performed. At block 412, the copy manager 212 reads the record i from the source volume metadata 218a and adds (at block 414) a metadata index entry $300_i$ to the metadata index 300 indicating a relative offset 304 of the read record i for the read record name 302 in the source volume metadata 218a. The read record i is added (at block 416) to the target volume metadata 218b. After creating metadata index 300 entries $300_i$ for all the target records 220a, the copy manager 212 writes (at block 420) the metadata index 300 to the target volume 202b, such as in a control data set of the target volume 202b. The source data sets 214a are copied (at block 422) to the target data sets 214b in the target volume 202b. In certain embodiments, the source data sets 214a are copied after the metadata is copied. The copy operation may comprise a point-in-time copy that is completed after copying the metadata, and the source data sets 214a are copied after the point-in-time copy is established. The copy operation may comprise other types of copy operation.

Once the metadata index 300 is generated, it may be used to directly access the records 220b for use in accessing the data sets 214b. The data sets 214b may be accessed after the point-in-time copy is made and before all the source data sets 214a are copied to the source volume 202b.

Figure 5:
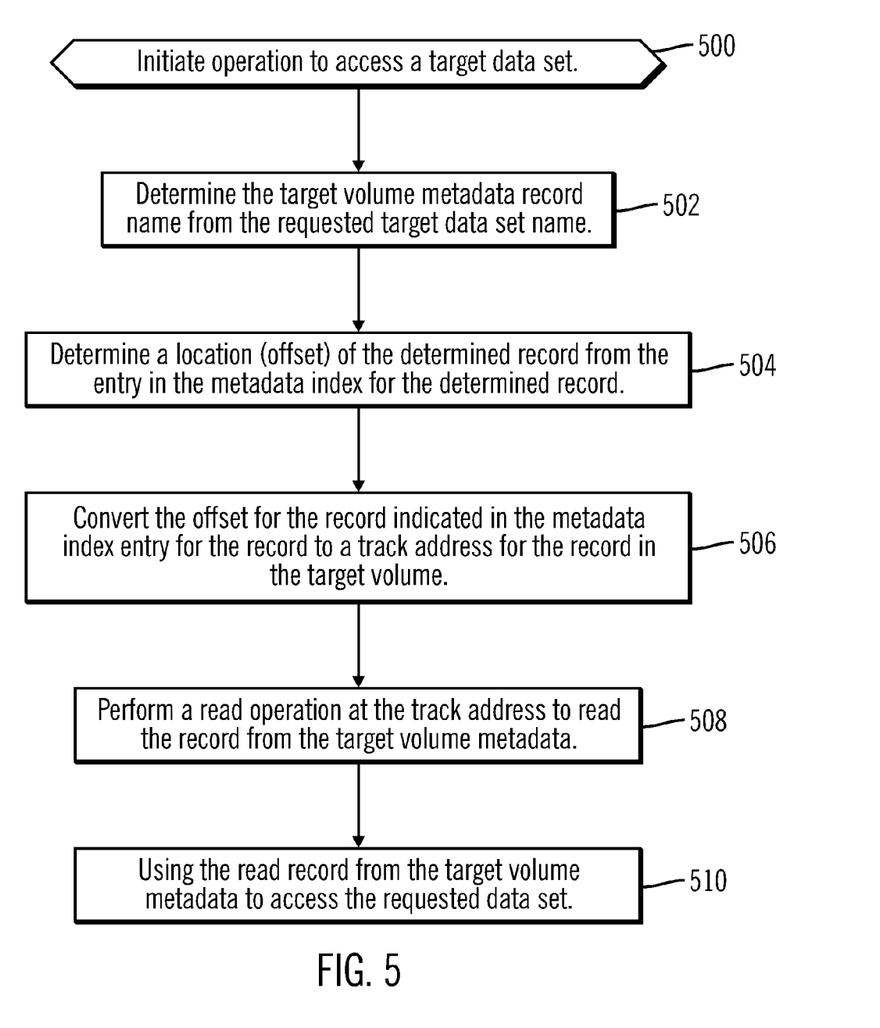
FIG. 5 illustrates an embodiment of operations to use the metadata index to access a target data set.

FIG. 5 illustrates an embodiment of operations performed by the operating system 210, such as a volume manager component, to access a target data set 214b in the target volume 202b. Upon initiating (at block 500) an operation to access one of the target data sets 214b, the operating system 210 determines (at block 502) the target volume metadata record name from the requested target data set name. The record name may be tied to the name of the data set 214b. A determination is made (at block 504) of a location (offset) 304 of the determined record from the entry $300_i$ in the metadata index 300 for the determined record 214b. The operating system 210 converts (at block 506) the offset 304 for the record indicated in the metadata index entry $300_i$, such as the entry 300i for the record name 302 of the determined record, to a physical address, such as a track address, for the record in the target volume metadata 218b. The operating system 210 performs (at block 508) a read operations at the track address to read the determined record 214b directly from the target volume metadata 218b. The read record from the target volume metadata 218b may be used (at block 510) to access the requested target data set 214b. In this way, a track or physical address of the record may be determined using the offset 304 in the metadata index 300, and the record can be read directly from the target volume metadata 218b.

In VSAM implementations, the track address may be determined as follows. The offset 304 may comprise an RBA that is converted to a relative track address. For instance, if the record resides in RBA 17635800, the operating system 210 may determine, by way of example, that the RBA (offset 304) resides in the 300th track of the VVDS. If the first track in the VVDS begins on cylinder 1, track 0, then the operating system 210 converts the RBA to an address defined by as cylinder, head and record (CCHHR) track location in a Count Key Data (CKD) volume 202b. By way of example, if the VVDS 218b begins on track 16, by adding 300 to 16 would result in a relative track address of 316. This value could then be converted to a CCHHR address and would result in the RBA residing on cylinder 21, track 0. This would allow a directed read of cylinder 21, track 0 to obtain the record 222b.

Described embodiments provide techniques to build a metadata index 300 during a copy operation for a source volume to a target volume that may be used to directly access metadata records 220b in the copied target metadata volume 218b. Described embodiments may be used in a copy operation where a metadata index would not be available after copying the source volume, such as the case if the target volume 202b is a conditioned volume having a different name 222b than the source volume name 222a.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium is any computer readable medium that is not a computer readable signal medium. The computer readable storage medium is a system, apparatus or device used to store data. Such system, apparatus or device may be of a type that includes, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the Figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 6:
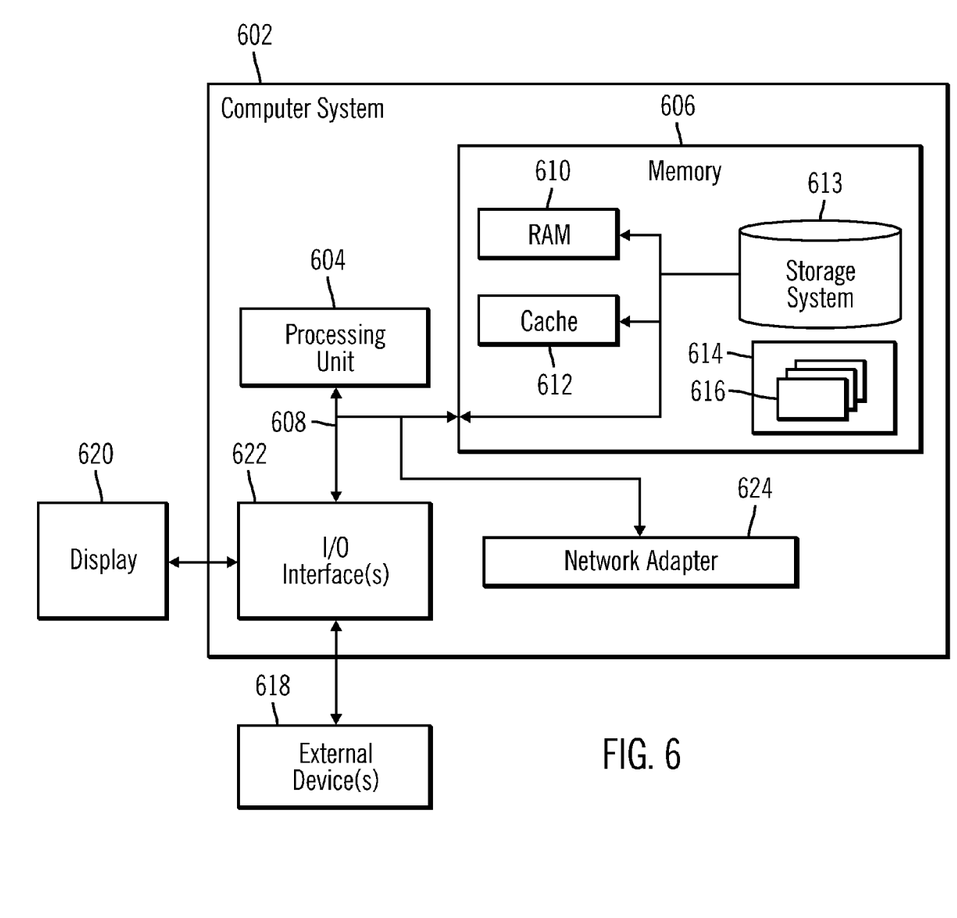
FIG. 6 illustrates a computing environment in which embodiments may be implemented.

The control unit 200 and components therein, may be implemented in one or more computer systems, such as the computer system 602 shown in FIG. 6. If the components of the computing environment of FIG. 2 are implemented in multiple systems, then the systems may communicate over the network adaptor 624. Computer system/server 602 may be described in the general context of computer system executable instructions, such as program modules, being executed by a computer system. Generally, program modules may include routines, programs, objects, components, logic, data structures, and so on that perform particular resources or implement particular abstract data types. Computer system/server 602 may be practiced in distributed cloud computing environments where resources are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 616 which generally carry out the functions and/or methodologies of embodiments of the invention as described herein.

Computer system/server 602 may also communicate with one or more external devices 618 such as a keyboard, a pointing device, a display 620, etc.; one or more devices that enable a user to interact with computer system/server 12; and/or any devices (e.g., network card, modem, etc.) that enable computer system/server 602 to communicate with one or more other computing devices. Such communication can occur via Input/output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing a target volume comprising a copy of a source volume, the computer program product comprising a computer readable storage medium having computer readable program code embodied therein that executes to perform operations, the operations comprising:
    initiating a copy operation to copy the source volume to the target volume, wherein the target volume is created with a target volume name different from a source volume name of the source volume;
    copying source volume metadata having records including information on data sets in the source volume to target volume metadata;
    generating a metadata index indicating locations of the records in the target volume metadata having information on the data sets in the target volume; and
    using the metadata index to access the records in the target volume metadata when accessing data sets in the target volume.

2. The computer program product of claim 1, wherein the operations further comprise:
    writing the metadata index to a control data set used to manage the target volume.

3. The computer program product of claim 1, wherein the generating the metadata index comprises:
    for each record in the source volume metadata:
        reading the record from the source volume metadata;
        indicating in the metadata index a relative offset of the read record in the source volume metadata;
        copying the read record to the target volume metadata.

4. The computer program product of claim 1, wherein the metadata index is generated before the data sets are copied from the source volume to the target volume.

5. The computer program product of claim 1, wherein a source volume metadata name and a target volume metadata name include the source volume name as a component of their names.

6. The computer program product of claim 1, wherein the source and target volume metadata is used to access a first type of data set and wherein a source and target volume table are used to access a second type of data set, further comprising:
    copying the source volume table to the target volume table, wherein the records in the source and target volume metadata provide metadata for the first and second types of data sets; and
    using the metadata index to access the records for the first and second types of data sets from the target volume metadata when accessing the first and second types of data sets on the target volume.

7. The computer program product of claim 6, wherein the first type of data set comprises an indexed Key Sequenced Data Set (KSDS) and the second type of data set comprises a non-KSDS data set, wherein the source and target volume metadata comprise source and target VSAM Volume Data Sets (VVDSs), wherein the records in the source and target VVDSs comprise VSAM volume records (VVRs) and non-VSAM volume records (NVRs) providing metadata for the first and second type of data sets, respectively, and wherein the source and target volume tables comprise source and target volume table of contents (VTOCs), wherein the source VSAM, the source VTOC, the target VSAM, and the target VTOC each include the source volume name as a component of their names.

8. The computer program product of claim 1, wherein the locations of the records in the metadata index comprise offsets into the metadata index, wherein using the metadata index to access one of the records in the target volume metadata comprises:
    converting the offset for the record indicated in the metadata index to a track address; and
    performing a read operation at the track address to read the record from the target volume metadata.

9. A system in communication with a source storage and a target storage, comprising:
    a processor; and
    a computer readable storage medium having code executed by the processor to perform operations, the operations comprising:

initiating a copy operation to copy a source volume in the source storage to a target volume in the target storage, wherein the target volume is created with a target volume name different from a source volume name of the source volume;

copying source volume metadata having records including information on data sets in the source volume to target volume metadata;

generating a metadata index indicating locations of the records in the target volume metadata having information on the data sets in the target volume; and using the metadata index to access the records in the target volume metadata when accessing data sets in the target volume.

10. The system of claim 9, wherein the operations further comprise:

writing the metadata index to a control data set in the target volume used to manage the target volume.

11. The system of claim 9, wherein the generating the metadata index further comprises:

for each record in the source volume metadata:
reading the record from the source volume metadata;
indicating in the metadata index a relative offset of the read record in the source volume metadata;
copying the read record to the target volume metadata.

12. The system of claim 9, wherein the metadata index is generated before the data sets are copied from the source volume to the target volume.

13. The system of claim 9, wherein a source volume metadata name and a target volume metadata name include the source volume name as a component of their names.

14. The system of claim 9, wherein the source and target volume metadata is used to access a first type of data set and wherein a source and target volume table are used to access a second type of data set, further comprising:

copying the source volume table to the target volume table, wherein the records in the source and target volume metadata provide metadata for the first and second types of data sets; and using the metadata index to access the records for the first and second types of data sets from the target volume metadata when accessing the first and second types of data sets on the target volume.

15. The system of claim 14, wherein the first type of data set comprises an indexed Key Sequenced Data Set (KSDS) and the second type of data set comprises a non-KSDS data set, wherein the source and target volume metadata comprise source and target VSAM Volume Data Sets (VVDSs), wherein the records in the source and target VVDSs comprise VSAM volume records (VVRs) and non-VSAM volume records (NVRs) providing metadata for the first and second type of data sets, respectively, and wherein the source and target volume tables comprise source and target volume table of contents (VTOCs), wherein the source VSAM, the source VTOC, the target VSAM, and the target VTOC each include the source volume name as a component of their names.

16. The system of claim 9, wherein the locations of the records in the metadata index comprise offsets into the metadata index, wherein using the metadata index to access one of the records in the target volume metadata comprises:

converting the offset for the record indicated in the metadata index to a track address; and
performing a read operation at the track address to read the record from the target volume metadata.

17. A method for managing a target volume comprising a copy of a source volume, comprising:

initiating a copy operation to copy the source volume in a source storage to the target volume in a target storage, wherein the target volume is created with a target volume name different from a source volume name of the source volume;

copying source volume metadata having records including information on data sets in the source volume to target volume metadata;

generating a metadata index indicating locations of the records in the target volume metadata having information on the data sets in the target volume; and using the metadata index to access the records in the target volume metadata when accessing data sets in the target volume.

18. The method of claim 17, wherein the operations further comprise:

writing the metadata index to a control data set in the target volume used to manage the target volume.

19. The method of claim 17, wherein the generating the metadata index further comprises:

for each record in the source volume metadata:
reading the record from the source volume metadata;
indicating in the metadata index a relative offset of the read record in the source volume metadata;
copying the read record to the target volume metadata.

20. The method of claim 17, wherein the metadata index is generated before the data sets are copied from the source volume to the target volume.

21. The method of claim 17, wherein a source volume metadata name and a target volume metadata name include the source volume name as a component of their names.

22. The method of claim 17, wherein the source and target volume metadata is used to access a first type of data set and wherein a source and target volume table are used to access a second type of data set, further comprising:

copying the source volume table to the target volume table, wherein the records in the source and target volume metadata provide metadata for the first and second types of data sets; and using the metadata index to access the records for the first and second types of data sets from the target volume metadata when accessing the first and second types of data sets on the target volume.

23. The method of claim 22, wherein the first type of data set comprises an indexed Key Sequenced Data Set (KSDS) and the second type of data set comprises a non-KSDS data set, wherein the source and target volume metadata comprise source and target VSAM Volume Data Sets (VVDSs), wherein the records in the source and target VVDSs comprise VSAM volume records (VVRs) and non-VSAM volume records (NVRs) providing metadata for the first and second type of data sets, respectively, and wherein the source and target volume tables comprise source and target volume table of contents (VTOCs), wherein the source VSAM, the source VTOC, the target VSAM, and the target VTOC each include the source volume name as a component of their names.

24. The method of claim 17, wherein the locations of the records in the metadata index comprise offsets into the metadata index, wherein using the metadata index to access one of the records in the target volume metadata comprises:

converting the offset for the record indicated in the metadata index to a track address; and
performing a read operation at the track address to read the record from the target volume metadata.

* * * * *